United States Patent [19]

Chang

[11] 4,016,181

[45] Apr. 5, 1977

[54] DYESTUFF PROCESS

[75] Inventor: Charles Hung Chang, Wyomissing Hills, Pa.

[73] Assignee: GAF Corporation, New York, N.Y.

[22] Filed: Mar. 18, 1976

[21] Appl. No.: 668,049

Related U.S. Application Data

[63] Continuation-in-part of Ser. No. 405,307, Oct. 11, 1973, abandoned.

[52] U.S. Cl. .................................. 260/380; 8/39 C
[51] Int. Cl.$^2$ ........................................ C07C 87/64
[58] Field of Search .................................... 260/380

[56] References Cited

UNITED STATES PATENTS

| 3,265,460 | 9/1966 | Hoare ................................. 260/380 |
| 3,549,667 | 12/1970 | Wunderlich et al. ............... 260/380 |
| 3,636,008 | 1/1972 | Yamada et al. .................... 260/380 |
| 3,792,970 | 2/1974 | Neeff ................................. 260/380 |

FOREIGN PATENTS OR APPLICATIONS

| 15,031 | 9/1967 | Japan ................................ 260/380 |
| 958,925 | 5/1964 | United Kingdom ............... 260/380 |
| 1,056,954 | 2/1967 | United Kingdom ............... 260/380 |

OTHER PUBLICATIONS

Chem. Abstracts, 69, 28596x (1968).
Pandhare et al., Indian Journal of Chemistry, vol. 9, pp. 1060–1063 (1971).
Houben, Das Anthracen und die Anthrachinone, p. 408 (1929).

*Primary Examiner*—Jane S. Myers
*Attorney, Agent, or Firm*—Walter C. Kehm; Marilyn J. Mau e

[57] ABSTRACT

A new overall method of producing chlorinated or brominated compounds of 2-(haloaryl)-4,5-diamino chrysazines from chrysazine without the need for isolation of intermediates at any point during the reaction; and to the novel products produced thereby, which products are good blue dyes having excellent build-up in heavy shades and are intended for dyeing cellulose acetate, cellulose triacetate, polyesters, and the like.

4 Claims, No Drawings

DYESTUFF PROCESS

This application in a continuation-in-part of U.S. patent application Ser. No. 405,307, filed Oct. 11, 1973, abandoned herewith.

This application relates to and has for its object a new overall method of producing chlorinated or brominated compounds of 2-(haloaryl)-4,5-diamino chrysazines from chrysazine without the need for isolation of intermdiates at any point during the reaction; and to the novel products produced thereby, which products are good blue dyes having excellent build-up in heavy shades and are intended for dyeing cellulose acetate, cellulose triacetate, polyesters, and the like.

The new dyestuffs of the present invention are represented by the following formula (I):

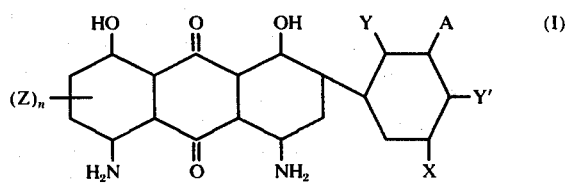

wherein Y is H, OH, lower alkoxy ($C_1$–$C_4$ alkoxy groups such as methoxy, ethoxy, propoxy, and butoxy), lower alkyl ($C_1$–$C_4$ alkyl such as methyl, ethyl, propyl, or butyl), chlorine or bromine and Y' is OH or lower alkoxy; A is H, lower alkyl, lower alkoxy, Cl or Br (lower alkoxy and lower alkyl being as previously defined); X is Cl or Br; Z is Cl or Br; and n is 0–2.

It is known from Indian Journal of Chemistry, Volume 9, Pages 1060 to 1063, that 2-(p-anisyl)-1,5-diamino-4,8-dihydroxyanthraquinone can be prepared from the corresponding 3,7-disulfonic acid and the production of 3-(p-anisly)-1,5-diamino-4,8-dihydroxyanthraquinone by arylation of the corresponding dinitro compound in the presence of boric acid followed by reduction with sodium hydrosulfide is also disclosed. U.S. Pat. No. 3,631,184 discloses 3-(3-bromo-4-hydroxyphenyl)-1,5-diamino-4,8-dihydroxyanthraquinone and a brominated derivative thereof useful for dyeing polyester fibers. Further, U.S. Pat. No. 3,549,667 claims the arylation of 1,5-dihydroxy-4,8-dinitroanthraquinone in the presence of boric acid to produce the corresponding 3-(hydroxy-or alkoxyphenol) substituted compound which can then be reduced to the corresponding monoamino or diamino derivative using sodium hydrosulfide as the reducing agent.

The only prior art which is known to relate to the production of 3-aryl-1,8-diamino-4,5-dihydroxyanthraquinones is U.S. Pat. No. 3,265,460. This patent relates particularly to 3-aryl-1,5-diamino-4,8-dihydroxyanthraquinones wherein the aryl group contains at least one hydroxy or alkoxy substituent and up to two other substituents, one of which may be chloro. In its broader aspects, this patent discloses aryl-$\alpha,\alpha$-diamino-$\alpha,\alpha$-dihydroxyanthraquinones. However, the only method of producing such dyes disclosed in this patent is by arylation of diaminodihydroxyanthraquinone disulfonic acids. This method works very well in a case of arylation of the 1,5-diamino-4,8-dihydroxy-configuration, but not in the case of the 1,8-diamino-4,5-dihydroxy-configuration. Even in Example 3 of the patent which describes arylation of a mixture 1,8-diamino-4,5-dihydroxy- and 1,5-diamino-4,8-dihydroxyanthraquinone disulfonic acids, it is believed that only the 1,5-diamino-4,8-dihydroxy-configuration arylates effectively. Arylation of the 1,8-diamino-4,5-dihydroxyanthraquinone alone in the manner of Example 3 of the patent results in a dyestuff which has poor sublimation properties in contrast to the statement in the patent that the dyestuffs provided thereby have excellent sublimation properties.

It is an object of the present invention to provide a new class of dyes having excellent build-up properties in heavy shades and useful for dyeing cellulose acetate, cellulose triacetate, polyesters, and the like. It is a further object of the present invention to provide a novel method by which such dyes can be prepared. Other objects will be apparent from the ensuing discussion of the invention.

One aspect of the present invention is the provision of a method for preparing the compounds of formula I from chrysazine in an efficient manner which avoids the necessity for the isolation of intermediates at any point during the reaction. This method is illustrated by the following series of equations:

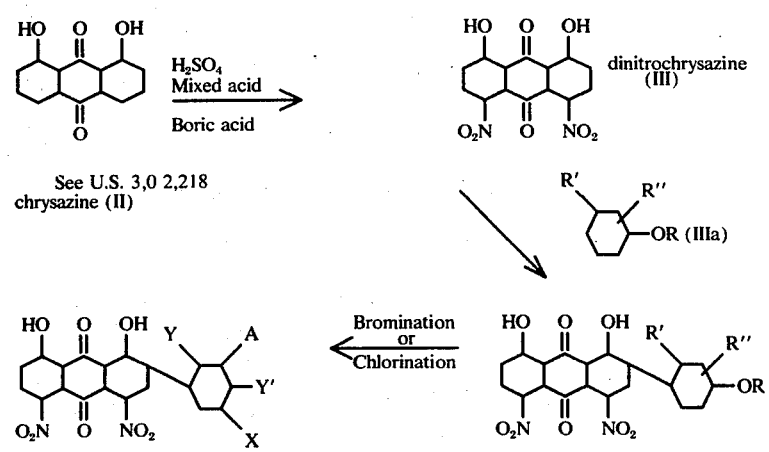

2-haloaryl-dinitrochrysazine (V)     2-aryl-dinitrochrysazine (IV)

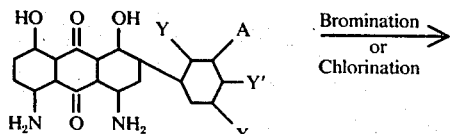   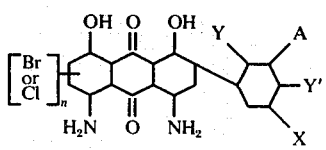

2-haloaryl-diaminochrysazine (VI)    2-haloaryl-halogenated-diaminochrysazine (VII)

In the foregoing equations R' is H, OH, lower alkoxy or lower alkyl; R is H or lower alkyl and R" is H, lower alkyl, or lower alkoxy. Y, Y', X, A, Z and $n$ are as defined above.

In the first step, chrysazine (II) is nitrated with mixed acid in the presence of boric acid giving dinitrochrysazine (III) using 2 to 3 moles of nitric acid per mold of chrysazine. Preferably, mixed nitric-sulfuric acid is used and the reaction is stirred for up to about 5 hours. The temperature is between about 10° C. and about 35° C. although elevated temperatures varying up to about 50° C. can be employed. Preferably, the reaction is conducted at between about 10° and about 30° C. in the presence of boric acid as outlined in U.S. Pat. No. 3,082,218.

The dinitrochrysazine resulting from the dinitration step is then arylated to give the 2-aryl-dinitrochrysazine compound shown in the formula (IV). The aryl compound (IIIa) is a phenol or an alkoxy benzene which may have lower alkoxy and/or lower alkyl substituents as shown in the formula (IIIa). Arylation is accomplished by lowering the temperature of the dinitrochrysazine to between about 0° and about 25° C, and then adding the phenolic (or alkoxybenzene) compound. The reaction mixture is maintained at 0° to 25° C. for from about 30 minutes to several hours.

The hydroxy- or alkoxy- compounds which may be employed in the arylation are exemplified by the following: phenol, cresols, anisoles, phentols, resorcinols, catechol, resorcinol- and cathecholmono and di -methyl, -ethyl, and -propyl, ethers, and the like.

The resultant mixture containing 2-aryl-dinitrochrysazine is halogenated by adding chlorine or bromine to the mixture. The usual amount of halogen is from 1 to 2 moles, and if desired, an excess of about 2% over 2 moles may be employed. A small catalytic amount of iodine or ferric chloride may be introduced to the halogenation mixture. Halogenation is usually conducted at reduced temperatures in the range of 0° to 40° C., preferably 5° to 30° C. The resultant mixture contains 2-haloaryl-dinitro chrysazine (V).

The mixture containing 2-haloaryl-dinitrochrysazine is then reduced directly by any known manner capable of converting nitro groups to amino groups. One suitable reduction system is concentrated or fuming sulfuric acid or a mixture of sulfur and oleum. A minimum of 2 moles of sulfur to an excess of about 4 moles of sulfur is employed, the temperature of reduction being higher than room temperature, e.g., 35° to 90° C. and preferably 60° to 75° C.

The resultant reaction mixture containing 2-haloaryl-diaminochrysazine (VI) can be isolated by drowning in water, filtering, washing and drying. Alternatively, the compound depicted by formula (VI) can be further halogenated in the same reactor at a temperatue in the range of 20° to 80° C using, if desired, the same halogenation system employed in the production of the compound of formula (V). It is noteworthy that the first halogenation step does not affect the anthraquinone nucleus due to the presence of nitro groups thereon. However, halogenation of the reduction product of compound (V), i.e., compound (VI), results in the addition of halogen directly to the anthraquinone moiety, evidently as a result of the presence of amino groups thereon. The halogenated product [compound (VII)] can be isolated in the manner described above.

The following examples are intended to further illustrate the present invention.

EXAMPLE 1

To a flask containing 24 g. (0.1 mole) chrysazine, 16g. (0.25 mole) boric acid and 100 ml. sulfuric acid 100% was added at 25°–30° C, 36.14 g. mixed acid (33% $HNO_3$–67% $H_2SO_4$). The mixture was stirred at 25°–30° C for 1 hour and cooled to 0° C. 11g. (0.102 mole) anisole was added dropwise at 0°–10° C. The mixture was stirred for 30 minutes followed by bromination for 2 hours at 5°–10° C employing 31.2 g. (0.19 mole) bromine in the presence of 0.1 g. iodine. To this brominated mixture was then added, at 5°–50° C. with occasional cooling, 200 g. fuming sulfuric acid containing 65% $SO_3$ and reduced at 65°–75° C. with 12 g. (0.375 mole) sulfur for 1 hour. It was then cooled to 30° C. and the product further brominated with 15.5 g. (0.096 mole) bromine for 18 hours.

The resulting mixture was drowned in 2 l. water at 25°–55° C. and heated to 90° C. The hot slurry was filtered, washed with water to neutrality yielding 280 g. wet cake of 2-(3,5-dibromo-4-methoxy-phenyl)-4,5-diamino-bromochrysazine.

The paste was admixed with 6 g. Marasperse, CB (partially desulfonated sodium lignosulfonade, dispersant, American Can Co.).

A dyebath was prepared consisting of 100 ml. water at 130° F., 1 ml. Aviton T Sol 10% (long chain hydrocarbonsulfonate, Dupont), 25 ml. Dowicide A Sol 10% sodium o-phenyl-phenolate, 20 ml. monosodium phosphate sol 10% and 4% dyestuff as the above prepared dispersion based on the weight of the fiber. The bath was diluted to 300 ml. Dacron polyester skein was immersed in the dyebath at 150°–160° F. and the pH adjusted to 6–6.5. The bath was raised to the boil and maintained at that temperature for 1½ hours. The skein was rinsed at 160° F., soaped at 160° F. with 1% Igepon T-51 (sodium N-methyl-oleoyltaurate) and 1% soda ash, rinsed and dried. A full dark blue dyeing was obtained which had excellent light fastness, sublimation properties and good exhaust.

EXAMPLE 2

To a flask containing 24 g. (0.1 mole) chrysazine and 16 g. (0.259 mole) boric acid dissolved in 100 ml. sulfuric acid 100% was added at 25°–30° C. 26.35 g. mixed acid (49% HNO₃, 46% H₂SO₄). The mixture was stirred at 30° C. for 2 hours, then cooled to 0° C. to which was then added 11 g. (0.102 mole) anisole at 0°–9° C. It was held at this temperature for 50 minutes. This mixture was then brominated with 34.8 g. (0.155 mole) bromine at 9°–25° C. for 1½ hours in the presence of 0.1 g. iodine. To the mixture was added dropwise at 10°–60° C. with occasional cooling, 200 g. fuming sulfuric acid followed by addition of 12 g. (0.375 mole sulfur. The mixture was stirred at 60°–68° C for 1 hour. The resulting mixture was cooled to 12° C., and the oleum was destroyed with ice water and cooling at 10°–45° C. To the sulfuric acid solution was then added 15.5 g. (0.096 mole) bromine to brominate, and after bromination the solution was drowned in 1.7 l. of water, filtered, washed neutral and dried. The product has structure:

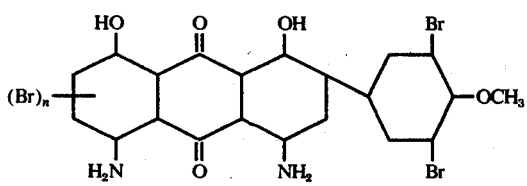

Br = 34.9%. After dispersion, the dyestuff dyed polyester fiber in blue shades having excellent build-up in heavy shades.

EXAMPLE 3

To a flask containing 24 g. chrysazine and 14 g. boric acid dissolved in 100 ml. sulfuric acid 100% was added dropwise at 12°–20° C., 25.5 g. mixed acid (49% HNO₃, 46% H₂SO₄). The mixture was stirred at 24° C. overnight, then cooled to 0° C. 12 g. anisole was added at 0°–10° C. Bromination was carried out at 10°–17° C. employing 31.2 g. (0.19 mole) bromine in the presence of 2 g. FeCl₃ for 3 hours. 200 g. fuming sulfuric acid was then introduced to the brominated mixture at 17°–60° C. with occasional cooling. 14 g. sulfur was then added portionwise at 60° C. After 2 hours the reduction mixture was drowned in water, filtered and washed with water to neutrality. The product has the formula:

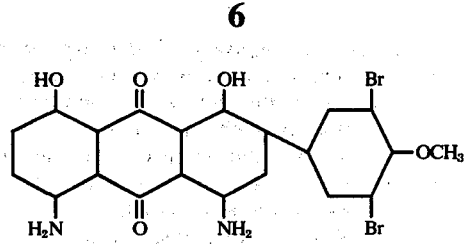

A dyeing on polyester fiber gave a birght blue shade having excellent build-up in heavy shades.

EXAMPLE 4

Example 1 was repeated with the exception that in place of the original bromination 21.3 g. (0.3 mole) chlorine was passed through the mixture. After reduction with sulfur the mixture was further chlorinated with 14.18 g. (0.2 mole) to give the corresponding 2-(3,5-dichloro-4-methoxyphenyl)-4,5-diamino-chlorochrysazine dyestuff.

EXAMPLE 5

Example 3 was repeated with the exceptions that instead of using 12 g. anisole, 6 g. anisole and 6 g. o-cresol were employed and 0.1 g. iodine was used as catalyst instead of the 2 g. FeCl₃. The product was a mixture of the two dyes:

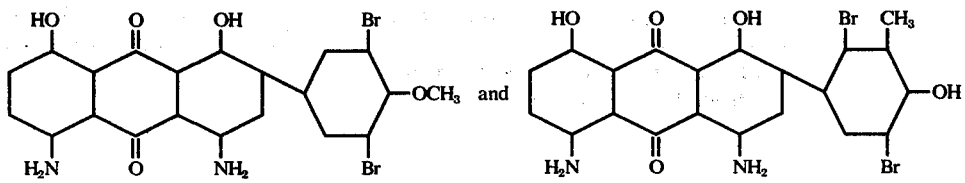

EXAMPLE 6

The procedure of Example 1 was followed with the exception that 16. g. (0.124 mole) o-methoxyphenol was substituted for the anisole, 2 g. FeCl₃ was substituted for the iodine catalyst and 3.2 g. was used in the final bromination at 50° C. for 3 hours instead of at room temperature for 18 hours.

The producst has the following structure:

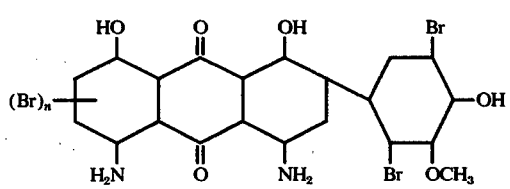

EXAMPLE 7

Attempt to Prepare 2-Aryl Diaminochrysazines by the Procedure Shown in Example 3 of the Allied Chemical Patent, U.S. Pat. No. 3,265,460

The arylation procedure of Example 1 of U.S. Pat. No. 3,265,460 was repeated using 4,5-diamino-2,7-disulfo-chrysazine, a component of the starting material named in Example 3 of the patent. The resultant dyestuff dyed polyester a blue shade of very poor sublimation fastness thus showing that the purported arylation had not occurred.

Having thus described my invention, I claim:

1. In a process for preparing a 2-(haoaryl)-diaminochrysazine the improvement which comprises, in a unitary reaction zone, the steps in combination:
    1. reacting chrysazine with nitric acid in the presence of boric acid and sulfuric acid at a temperature between about 10° C. and about 50° C. to form 4,5-dinitrochrysazine in the reaction zone:
    2. reacting said 4,5-dinitrochrysazine with an arylating agent selected from the group consisting of anisole, cresol, and methoxyphenol to form the corresponding 2-aryl-dinitrochrysazine at a temperature between 0° and 25° C. in said reaction zone;
    3. contacting said 2aryl-dinitrochrysazine in said reaction zone with chlorine or bromine to halogenate said 2aryl moiety at a temperature between 0° and 40° C. in the presence of a catalytic amount of iodine or ferric chloride catalyst to produce the corresponding 2-(haloaryl)-dinitrochrysazine; and
    4. subjecting the resultant 2-(haloaryl)-dinitrochrysazine to reducing conditions in said reaction zone in the presence of sulfuric acid at a temperature between 35° and 90° C to convert the nitro groups to amino groups and form the corresponding 2(haloaryl)-diaminochrysazine.

2. The process of claim 1 wherein said 2-(haloaryl)-4,5-diaminochrysazine from step (4) is then halogenated on the anthraquinone moiety in said reaction zone by contacting with bromine or chlorine at a temperature between 20° and 80° C.

3. The process of claim 1 for the preparation of a compound selected from the group consisting of a 2-(4-methoxy-3,5-dihalophenyl)-4,5-diaminochrysazine, 2-(4-hydroxy-2,5-dihalo-3-methylphenyl)-4,5-diamino-chrysazine wherein said halo is chloro or bromo, which comprises the steps in combination:
    1. reacting chrysazine with nitric acid in the presence of boric acid and sulfuric acid at a temperature between about 10° and 30° C. to form 4,5-dinitrochrysazine in a reaction zone;
    2. reacting said 4,5-dinitro-chrysazine in said reaction zone with an arylating agent selected from the group consisting of anisole, o-cresol and o-methoxyphenol at a temperature between 0° C. and 25° C. to form the corresponding 2-aryl-4,5-dinitrochrysazine;
    3. contacting the resulting reaction mixture of step (2) in said reaction zone with chlorine or bromine to effect halo substitution on the aryl moiety at a temperature between 5° and 30° C. to form the corresponding 2(haloaryl)-4,5-dinitro-chrysazine from said 2-aryl-4,5-dinitro-chrysazine; and
    4. subjecting the reaction mixture of step (3) in said reaction zone to reducing conditions at a temperature between 35° and 90° C. in the presence of fuming sulfuric acid and sulfur to convert the nitro groups to amino groups and form the corresponding 2-(haloaryl)-4,5-diamino-chrysazine as a product of the process.

4. The process of claim 3 wherein the resulting reaction mixture of step (4) is halogenated with chlorine or bromine to halogenate the anthraquinone moiety of said product at a temperature between 20° and about 80° C.

* * * * *